US010527322B2

(12) United States Patent
Naito et al.

(10) Patent No.: US 10,527,322 B2
(45) Date of Patent: Jan. 7, 2020

(54) AIR CONDITIONER

(71) Applicant: Hitachi-Johnson Controls Air Conditioning, Inc., Tokyo (JP)

(72) Inventors: Koji Naito, Tokyo (JP); Kazumoto Urata, Tokyo (JP); Kazuhiko Tani, Tokyo (JP); Masayoshi Murofushi, Tokyo (JP); Gen Yasuda, Tokyo (JP)

(73) Assignee: Hitachi-Johnson Controls Air Conditioning, Inc., Tokyo (JP)

( * ) Notice: Subject to any disclaimer, the term of this patent is extended or adjusted under 35 U.S.C. 154(b) by 118 days.

(21) Appl. No.: 15/758,419

(22) PCT Filed: Sep. 11, 2015

(86) PCT No.: PCT/JP2015/075868
§ 371 (c)(1),
(2) Date: Mar. 8, 2018

(87) PCT Pub. No.: WO2017/042967
PCT Pub. Date: Mar. 16, 2017

(65) Prior Publication Data
US 2018/0252443 A1 Sep. 6, 2018

(51) Int. Cl.
*F25B 13/00* (2006.01)
*F25B 41/06* (2006.01)
*F25B 49/02* (2006.01)

(52) U.S. Cl.
CPC ............ *F25B 13/00* (2013.01); *F25B 41/062* (2013.01); *F25B 49/02* (2013.01);
(Continued)

(58) Field of Classification Search
CPC ........ F25B 13/00; F25B 41/062; F25B 49/02; F25B 2313/007; F25B 2313/0231;
(Continued)

(56) References Cited

U.S. PATENT DOCUMENTS

2009/0031739 A1* 2/2009 Kasahara ............... F25B 13/00
62/196.1
2010/0043467 A1* 2/2010 Kawano ................. F25B 13/00
62/129
(Continued)

FOREIGN PATENT DOCUMENTS

EP 2 354 723 A2 8/2011
EP 2375188 A 10/2011
(Continued)

OTHER PUBLICATIONS

Extended European Search Report received in corresponding European Application No. 15903629.2 dated Mar. 22, 2019.
International Search Report of PCT/JP2015/075868 dated Dec. 15, 2015.

*Primary Examiner* — Marc E Norman
(74) *Attorney, Agent, or Firm* — Mattingly & Malur, PC

(57) ABSTRACT

Provided is a air conditioner including high-and-low-pressure gas pipe expansion valves each of which is provided to a corresponding one of the cooling-heating switching units and adjusts feeding of high-temperature and high-pressure gas refrigerant to the corresponding indoor unit; and a refrigeration cycle controller which adjusts a valve opening degree of the high-and-low-pressure gas pipe expansion valve of the cooling-heating switching unit connected to one of the indoor units which is not in heating operation, in accordance with a determination result on excess or deficiency of refrigerant in a refrigeration cycle.

10 Claims, 5 Drawing Sheets

(52) U.S. Cl.
CPC . *F25B 2313/007* (2013.01); *F25B 2313/0231* (2013.01); *F25B 2313/0233* (2013.01); *F25B 2313/02742* (2013.01); *F25B 2313/0314* (2013.01); *F25B 2313/0315* (2013.01); *F25B 2341/0661* (2013.01); *F25B 2500/23* (2013.01); *F25B 2500/24* (2013.01); *F25B 2600/2513* (2013.01); *F25B 2700/21151* (2013.01); *F25B 2700/21152* (2013.01)

(58) Field of Classification Search
CPC .... F25B 2313/0233; F25B 2313/02742; F25B 2313/0314; F25B 2313/0315; F25B 2341/0661; F25B 2500/23; F25B 2500/24; F25B 2600/2513; F25B 2700/21151; F25B 2700/21152
See application file for complete search history.

(56) References Cited

U.S. PATENT DOCUMENTS

| | | | |
|---|---|---|---|
| 2012/0118530 A1* | 5/2012 | Yamashita | F24F 3/06 165/58 |
| 2014/0026603 A1* | 1/2014 | Toya | F24F 1/0003 62/129 |
| 2018/0017293 A1* | 1/2018 | Naito | F25B 13/00 |

FOREIGN PATENT DOCUMENTS

| | | |
|---|---|---|
| EP | 2 522 919 A2 | 11/2012 |
| JP | 2004-278813 A | 10/2004 |
| JP | 2008-116073 A | 5/2008 |
| JP | 2011-208928 A | 10/2011 |

* cited by examiner

⊗ VALVE IS OPEN
● VALVE IS CLOSED
⊛ OPENING DEGREE OF VALVE IS CONTROLLED

AIR CONDITIONER

TECHNICAL FIELD

The present invention relates to a simultaneous cooling-heating multi-air conditioner capable of performing a mixed operation of heating operation and cooling operation of multiple indoor units.

BACKGROUND ART

In order to support a case where cooling operation and heating operation of indoor units are mixed, and other cases, a simultaneous cooling-heating multi-air conditioner includes cooling-heating switching units installed between the outdoor unit and the indoor units for switching pipes connected to indoor gas pipes, between a high-pressure gas pipe and a low-pressure gas pipe.

Here, in the case where it is not preferable that high-temperature and high-pressure gas refrigerant flow into an indoor unit in cooling operation, in non-operation, in the heating thermo-off state, or in blow operation, the indoor gas pipe is connected to the low-pressure gas pipe using the cooling-heating switching unit, and the circuit on the high-pressure gas pipe side is closed.

Closing the circuit on the high-pressure gas pipe side as described above may cause gas refrigerant in a high-pressure gas branch pipe of the cooling-heating switching unit, which is now closed, to condense and turn into liquid refrigerant. If gas refrigerant is flowing, no condensation occurs. However, since the high-pressure gas branch is closed, condensation of the gas refrigerant occurs.

If condensation of gas refrigerant occurs in a high-pressure gas branch pipe of a cooling-heating switching unit, the amount of refrigerant circulating in the entire air conditioner becomes deficient, causing a problem that the refrigerant for heating operation of other indoor units becomes deficient.

To prevent liquid refrigerant from accumulating in the high-pressure gas branch pipe of the cooling-heating switching unit as above, Patent Literature 1 discloses a technique of slightly opening an expansion valve on the high-pressure gas pipe side of the cooling-heating switching unit of an indoor unit in which heating operation is not operated or suspended, and opening the expansion valve on the low-pressure gas pipe side to collect the refrigerant when the room temperature becomes a predetermined temperature. Patent Literature 1 also discloses a technique of connecting a bypass capillary tube instead of slightly opening the expansion valve on the high-pressure gas pipe side.

CITATION LIST

Patent Literature

Patent Literature 1: JP 2008-116073 A

SUMMARY OF INVENTION

Technical Problem

The above related art is capable of preventing liquid refrigerant from accumulating in the high-pressure branch pipe of the cooling-heating switching unit.

However, since part of high-pressure gas refrigerant which is supposed to be used for heating is bypassed, the deterioration in the operation efficiency as the entire air conditioner cannot be prevented. In addition, the amount of extra refrigerant can increase depending on the operation state. However, if the accumulation of the liquid refrigerant in the high-pressure gas branch pipe is reduced excessively, too much refrigerant may accumulate in a condenser and decrease the operating efficiency.

An object of the present invention is to provide a simultaneous cooling-heating multi-air conditioner in which decrease in operating efficiency is prevented.

Solution to Problem

To solve the above problems, an air conditioner according to the present invention having a plurality of indoor units and being capable of operating cooling operation and heating operation simultaneously by switching cooling-heating switching units connected to a corresponding one of the indoor units respectively, includes: high-and-low-pressure gas pipe expansion valves each of which is provided to a corresponding one of the cooling-heating switching units and adjusts feeding of high-temperature and high-pressure gas refrigerant to the corresponding indoor unit; and a refrigeration cycle controller which adjusts a valve opening degree of the high-and-low-pressure gas pipe expansion valve of the cooling-heating switching unit connected to one of the indoor units which is not in heating operation, in accordance with a determination result on excess or deficiency of refrigerant in a refrigeration cycle.

In addition, an air conditioner according to the present invention having a plurality of indoor units and being capable of operating cooling operation and heating operation simultaneously by switching cooling-heating switching units connected to a corresponding one of the indoor units respectively, includes: high-and-low-pressure gas pipe expansion valves each of which is provided to a corresponding one of the cooling-heating switching units and adjusts feeding of high-temperature and high-pressure gas refrigerant to the corresponding indoor unit; and a refrigeration cycle controller which adjusts a valve opening degree of the high-and-low-pressure gas pipe expansion valve of the cooling-heating switching unit connected to one of the indoor units which is not in heating operation, such that a degree of subcooling of refrigerant at an outlet of an indoor-unit heat exchanger of one of the indoor units which is in heating operation is within a predetermined range.

Advantageous Effects of Invention

According to the present invention, high-temperature and high-pressure gas refrigerant is bypassed as necessary, and thus it possible to prevent decrease in operating efficiency caused by excess or deficiency of refrigerant in a simultaneous cooling-heating multi-air conditioner.

DESCRIPTION OF EMBODIMENTS

Hereinafter, descriptions will be provided in detail for an embodiment of the present invention, using the drawings.

Figure 1:
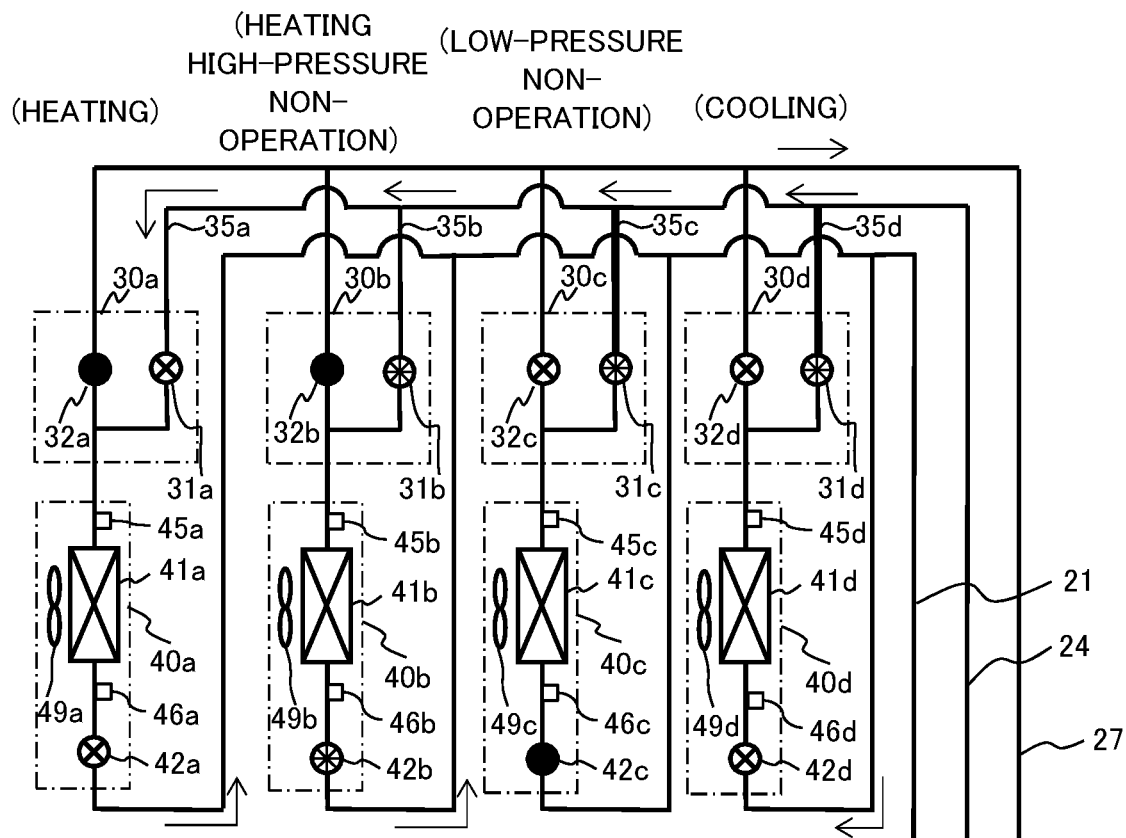
FIG. 1 is a refrigeration cycle system diagram of an air conditioner according to an embodiment.
Figure 1:
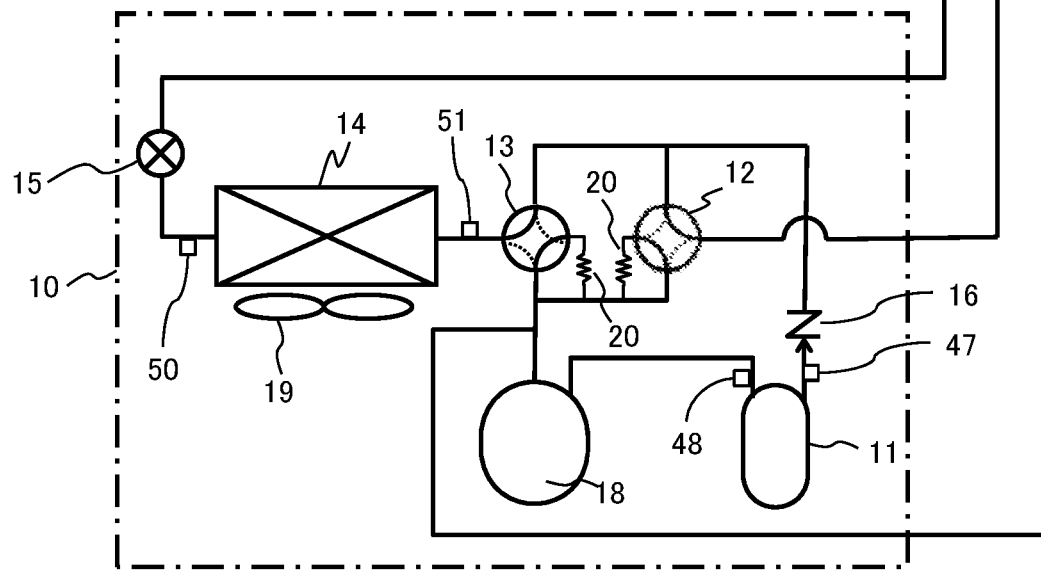
Figure 2:
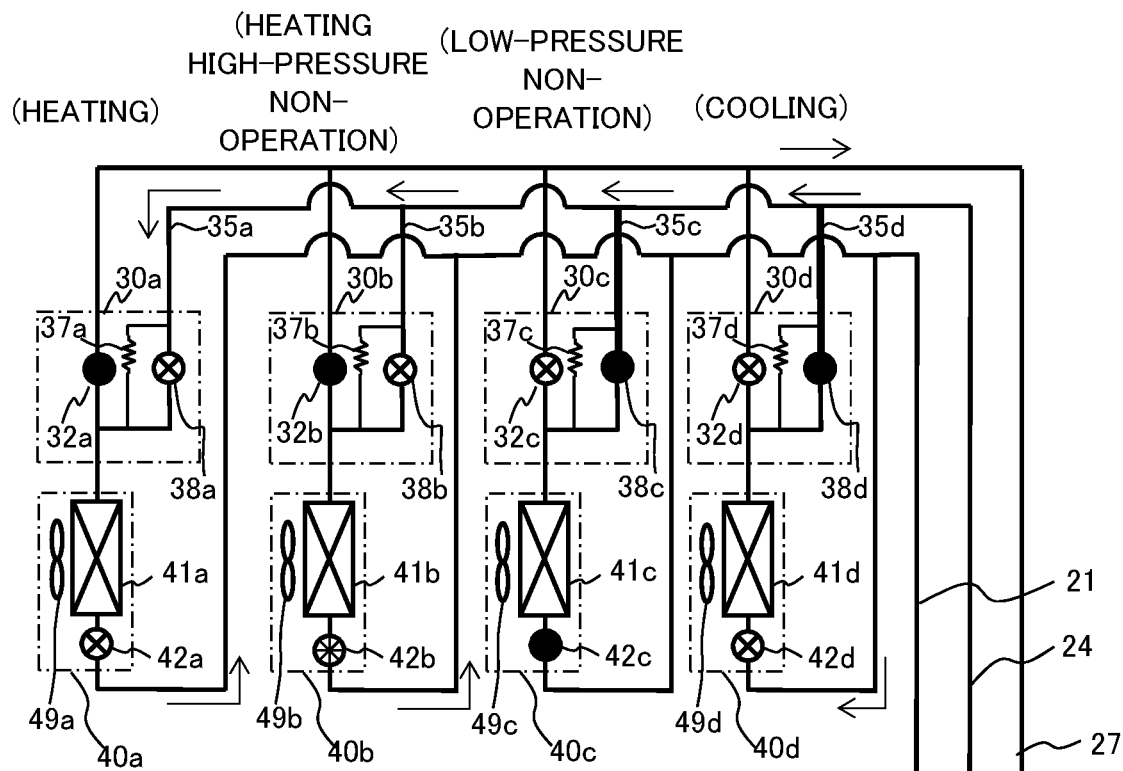
FIG. 2 is a refrigeration cycle system diagram of an air conditioner according to a comparative example.
Figure 2:
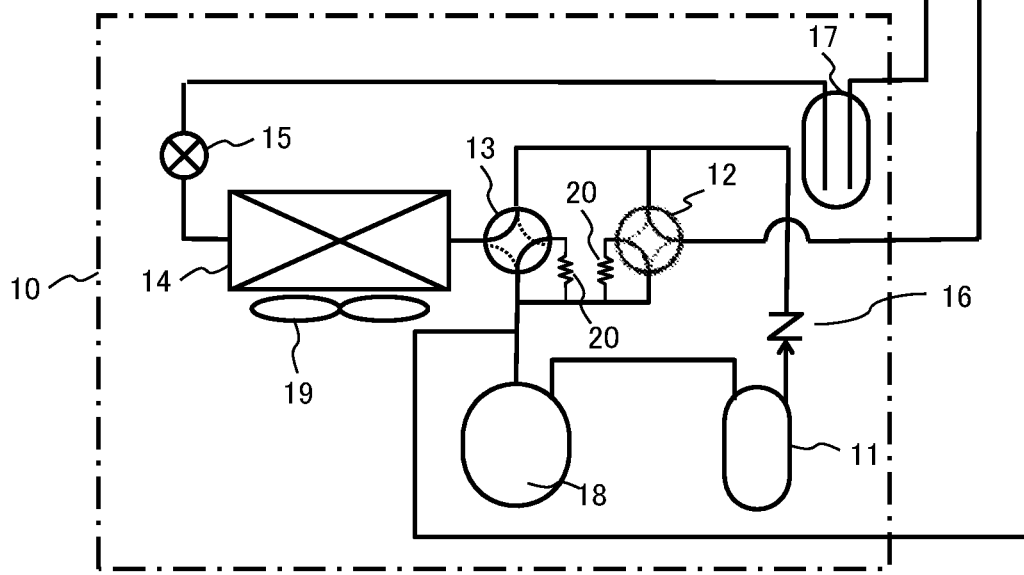

FIG. 1 is a refrigeration cycle system diagram of an air conditioner according to an embodiment of the present invention, and FIG. 2 is a refrigeration cycle system diagram of an air conditioner according to a comparative example.

The air conditioner of the embodiment includes: an outdoor unit 10; indoor units 40a, 40b, 40c, and 40d (hereinafter sometimes generally referred to as indoor units 40); and cooling-heating switching units 30a, 30b, 30c, and 30d (hereinafter sometimes generally referred to as cooling-heating switching units 30) located between the indoor units 40 and the outdoor unit 10.

Although FIG. 1 illustrates a configuration including four indoor units 40, the number of indoor units 40 is not limited to this number but may be two or more. In addition, although the configuration includes one outdoor unit 10, the number of outdoor units 10 is not limited to this number but may be two or more.

The indoor units 40 have four states: heating operation, cooling operation, heating high-pressure non-operation, and non-operation (low-pressure non-operation), and is in one of the four states. The multiple indoor units 40 is capable of performing a mixed operation of heating operation and cooling operation, and can be in a mixed state of heating or cooling operation, and the heating high-pressure non-operation or the non-operation state.

FIG. 1 illustrates a case of a mixed operation where the indoor unit 40a is in heating operation, the indoor unit 40b in heating high-pressure non-operation, the indoor unit 40c in low-pressure non-operation, and the indoor unit 40d in cooling operation.

The indoor units 40 and the cooling-heating switching units 30 are connected to the outdoor unit 10 with a liquid main pipe 21, a high-and-low-pressure gas main pipe 24, and a low-pressure gas main pipe 27. More specifically, each of the liquid main pipe 21, high-and-low-pressure gas main pipe 24, and low-pressure gas main pipe 27 branches out to be connected to the respective indoor units 40 and cooling-heating switching units 30. For example, the high-and-low-pressure gas main pipe 24 branches out into high-and-low-pressure gas branch pipes 35a, 35b, 35c, and 35d (hereinafter sometimes generally referred to as high-and-low-pressure gas branch pipes 35), which are connected to the cooling-heating switching units 30a, 30b, 30c, and 30d, respectively. The low-pressure gas main pipe 27 also branches out to be connected to the cooling-heating switching units 30a, 30b, 30c, and 30d. The liquid main pipe 21 also branches out to be connected to the indoor units 40a, 40b, 40c, and 40d.

The cooling-heating switching units 30 each having a high-and-low-pressure gas pipe expansion valve 31 (the general name of the high-and-low-pressure gas pipe expansion valve 31a, 31b, 31c, or 31d) and a low-pressure gas pipe expansion valve 32 (the general name of the low-pressure gas pipe expansion valve 32a, 32b, 32c, or 32d) are two-branch circuits connecting the indoor unit 40 and the high-and-low-pressure gas main pipe 24 and low-pressure gas main pipe 27.

The cooling-heating switching unit 30 changes the direction of refrigerant flowing through the indoor unit 40 by opening or closing the high-and-low-pressure gas pipe expansion valves 31 and the low-pressure gas pipe expansion valve 32, to switch the operation of an evaporator and the operation of a condenser of an indoor-unit heat exchanger 41 (the general name of the indoor-unit heat exchanger 41a, 41b, 41c, or 41d) in cooperation with pressure reduction throttling and opening or closing operation of the indoor-unit expansion valve 42 (the general name of the indoor-unit expansion valve 42a, 42b, 42c, or 42d).

Note that in this specification, not only throttle valves for pressure reduction of high-pressure liquid refrigerant or gas-liquid two-phase refrigerant but also variable flow-rate valves not for pressure reduction but for flow-rate adjustment by controlling the degree of opening and control valves for opening or closing the flow of refrigerant, are also referred to as expansion valves.

The indoor unit 40 includes an indoor-unit heat exchanger 41, an indoor-unit expansion valve 42, and an indoor unit fan 49 (the general name of the indoor unit fan 49a, 49b, 49c, or 49d). One end of the indoor-unit heat exchanger 41 communicates with the liquid main pipe 21 via the indoor-unit expansion valve 42, and the other end of the indoor-unit heat exchanger 41 communicates with the cooling-heating switching unit 30.

The outdoor unit 10 includes a compressor 11, high-and-low-pressure gas pipe side four-way valve 12, heat-exchanger side four-way valve 13, outdoor-unit heat exchanger 14, outdoor-unit expansion valve 15, outdoor-unit fan 19, and accumulator 18. Here, the accumulator 18 separates liquid refrigerant from the low-pressure gas refrigerant in a gas-liquid mixed state and sends out the gas refrigerant to the compressor 11.

The accumulator 18 side of the compressor 11 is the low-pressure side, and the four-way valve side of the compressor 11, connected to a compressor check valve 16, is the high-pressure side. This differential pressure of the compressor 11 conveys the refrigerant. Since the compressor 11 sucks the gas refrigerant after the accumulator 18 separates the liquid refrigerant, liquid compression does not occur in the compressor 11.

Next, the high-and-low-pressure gas pipe side four-way valve 12 and the heat-exchanger side four-way valve 13 will be described.

The high-and-low-pressure gas pipe side four-way valve 12 switches between connecting the high-and-low-pressure gas main pipe 24 to the discharge side of the compressor 11 and connecting the high-and-low-pressure gas main pipe 24 to the suction side of the accumulator 18. When one of the indoor units 40 performs heating operation, the high-and-low-pressure gas main pipe 24 is connected to the discharge side of the compressor 11, and high-temperature and high-pressure gas refrigerant is fed to the high-and-low-pressure gas main pipe 24.

The heat-exchanger side four-way valve 13 switches between connecting the outdoor-unit heat exchanger 14 to the discharge side of the compressor 11 and connecting the outdoor-unit heat exchanger 14 to the suction side of the accumulator 18. More specifically, when the outdoor-unit heat exchanger 14 serves as a condenser, the outdoor-unit heat exchanger 14 is connected to the discharge side of the compressor 11, and when the outdoor-unit heat exchanger 14 serves as an evaporator, the outdoor-unit heat exchanger 14 is connected to the suction side of the accumulator 18.

The connection switching of the heat-exchanger side four-way valve 13 is performed depending on the condition of the heating load and the cooling load of the air conditioner. More specifically, when the heating load of the air conditioner is large, the heat-exchanger side four-way valve 13 is switched to connect the outdoor-unit heat exchanger 14 to the suction side of the accumulator 18, and also the outdoor-unit expansion valve 15 is throttled to reduce the pressure, so that the outdoor-unit heat exchanger 14 serves as an evaporator. When the cooling load of the air conditioner is large, the heat-exchanger side four-way valve 13 is switched to connect the outdoor-unit heat exchanger 14 to the discharge side of the compressor 11, and also the outdoor-unit expansion valve 15 is opened, so that the outdoor-unit heat exchanger 14 serves as a condenser.

Outdoor-unit capillaries 20 connect the empty terminals of the high-and-low-pressure gas pipe side four-way valve 12 and the heat-exchanger side four-way valve 13 to the suction side of the accumulator 18. This makes it possible to use the four-way valves as three-way valves.

An air conditioner according to the comparative example illustrated in FIG. 2 is different from the air conditioner according to the embodiment in FIG. 1 in that the configurations of the cooling-heating switching units 30 are different and the air conditioner according to the comparative example has a refrigerant-amount adjustment tank 17.

Here, the refrigerant-amount adjustment tank 17 is provided for adjusting the amount of refrigerant in the air conditioner.

A high-and-low-pressure gas pipe expansion valve 38 (the general name of the high-and-low-pressure gas pipe expansion valve 38a, 38b, 38c, or 38d) in the cooling-heating switching unit 30 in the comparative example is an expansion valve for controlling opening or closing of the refrigerant flow. Provided in parallel with the high-and-low-pressure gas pipe expansion valve 38 is a bypass capillary 37 (the general name of the bypass capillary 37a, 37b, 37c, or 37d).

The difference between the air conditioner according to the comparative example illustrated in FIG. 2 and the air conditioner according to this embodiment in FIG. 1 will be described below in more detail.

Next, the flow of refrigerant in the indoor unit 40 will be described using FIGS. 1 and 2.

First, descriptions will be provided for a case where an indoor unit 40 performs heating operation (see the indoor unit 40a and the cooling-heating switching unit 30a in FIG. 1). High-temperature and high-pressure gas refrigerant compressed in the compressor 11 is sent to the high-and-low-pressure gas main pipe 24 by the high-and-low-pressure gas pipe side four-way valve 12.

Here, the low-pressure gas pipe expansion valve 32 in the cooling-heating switching unit 30 is closed so that the low-pressure gas main pipe 27 does not communicate with the indoor-unit heat exchanger 41, and the high-and-low-pressure gas pipe expansion valve 31 is open so that the refrigerant flows from the high-and-low-pressure gas main pipe 24 to the indoor-unit heat exchanger 41. With this, the high-temperature and high-pressure gas refrigerant compressed in the compressor 11 is fed to the indoor-unit heat exchanger 41.

Note that in FIG. 1, the states of "valve is open", "valve is closed", and "opening degree of valve is controlled" on the high-and-low-pressure gas pipe expansion valves 31, low-pressure gas pipe expansion valves 32, and indoor-unit expansion valves 42 are illustrated as the explanatory legends.

The indoor-unit heat exchanger 41 serves as a condenser to perform heating by the heat of condensation of the high-temperature and high-pressure gas refrigerant. The condensed high-pressure liquid refrigerant or gas-liquid two-phase refrigerant flows through the indoor-unit expansion valve 42 with its valve open and is sent to the liquid main pipe 21.

To stop the indoor unit (thermo-off) after the temperature of the room which the indoor unit 40 is heating reaches a set temperature, the air flow of the indoor fan is reduced or stopped to reduce the temperature rise due to heat exchange with refrigerant, and the flow of refrigerant is reduced to put the indoor unit 40 and the cooling-heating switching unit 30 into the heating high-pressure non-operation state (see the indoor unit 40b and the cooling-heating switching unit 30b in FIG. 1).

Here, since the high-temperature and high-pressure gas refrigerant in the high-and-low-pressure gas branch pipe 35, a connection pipe between the high-and-low-pressure gas pipe expansion valve 31 and the indoor-unit heat exchanger 41, and the indoor-unit heat exchanger 41, is radiating heat at the surfaces of the pipes, the gas refrigerant is condensed into liquid refrigerant.

In the air conditioner according to the comparative example in FIG. 2, the high-and-low-pressure gas pipe expansion valve 38 is opened and the indoor-unit expansion valve 42 (indoor-unit expansion valve 42b) is set to a predetermined opening degree, to reduce the flow of the gas refrigerant.

Here, the valve opening degree of the indoor-unit expansion valve 42 is made larger when the liquid refrigerant accumulates too much, and it is made smaller, when the refrigerant flows out as gas-liquid two-phase refrigerant.

In the air conditioner according to this embodiment in FIG. 1, the flow rate of the refrigerant is controlled by adjusting the opening degrees of the high-and-low-pressure gas pipe expansion valve 31 (high-and-low-pressure gas pipe expansion valve 31b in FIG. 1) and the indoor-unit expansion valve 42 (indoor-unit expansion valve 42b in FIG. 1), to control the amount of the liquid refrigerant condensed in the high-and-low-pressure gas branch pipe 35, the connection pipe between the high-and-low-pressure gas pipe expansion valve 31 and the indoor-unit heat exchanger 41, and the indoor-unit heat exchanger 41.

More specifically, if both the indoor-unit expansion valve 42 and the high-and-low-pressure gas pipe expansion valve are adjusted to be narrower, the refrigerant can be accumulated in the high-and-low-pressure gas branch pipe 35 and the connection pipe between the high-and-low-pressure gas pipe expansion valve 31 and the indoor-unit heat exchanger 41. On the other hand, if both the indoor-unit expansion valve 42 and the high-and-low-pressure gas pipe expansion valve 31 are adjusted to be wider, it is possible to reduce the accumulation of refrigerant in the high-and-low-pressure gas branch pipe 35 and the connection pipe between the high-and-low-pressure gas pipe expansion valve 31 and the indoor-unit heat exchanger 41. If the indoor-unit expansion valve 42 is adjusted to be wider, and the high-and-low-pressure gas pipe expansion valve 31 is adjusted to be narrower, the ratio of the high-temperature and high-pressure gas refrigerant decreases in the indoor-unit heat exchanger 41, and the refrigerant accumulates. If the indoor-unit expansion valve 42 is adjusted to be narrower, and the high-and-low-pressure gas pipe expansion valve 31 is adjusted to be wider, the ratio of the high-temperature and high-pressure gas refrigerant increases in the indoor heat exchanger 41, and it is possible to reduce the accumulation of refrigerant.

Next, descriptions will be provided for a case where an indoor unit 40 performs cooling operation (see the indoor unit 40d and the cooling-heating switching unit 30d in FIG. 1). In this case, the high-pressure liquid refrigerant or gas-liquid two-phase refrigerant discharged from the outdoor-unit heat exchanger 14 in operation as a condenser is fed to the indoor unit 40d via the liquid main pipe 21, or condensed refrigerant is fed from other indoor units 40 in heating operation. For example, the indoor unit 40a in FIG. 1 is in heating operation, and the refrigerant discharged from the indoor-unit heat exchanger 41a operating as a condenser flows through the indoor-unit expansion valve 42a with the valve open and is fed to the indoor unit 40d.

The opening degree of the indoor-unit expansion valve 42 in the indoor unit 40 is adjusted such that the indoor-unit expansion valve 42 serves as a throttle valve to reduce the pressure of the high-pressure liquid refrigerant or gas-liquid two-phase refrigerant. The refrigerant the pressure of which has been reduced is evaporated by the indoor-unit heat exchanger 41 serving as an evaporator and turns into low-pressure gas refrigerant. The heat of evaporation of the refrigerant at this time is used for cooling.

The low-pressure gas refrigerant vaporized in the indoor-unit heat exchanger 41 is sent to the low-pressure gas main pipe 27 via the low-pressure gas pipe expansion valve 32 of the cooling-heating switching unit 30 with the valve open. The low-pressure gas main pipe 27 is connected to the outdoor unit 10, and the gas refrigerant returns to the compressor 11 through the accumulator 18. Then, the gas refrigerant is compressed again in the compressor 11 to circulate.

Since the high-and-low-pressure gas pipe expansion valve 31 (high-and-low-pressure gas pipe expansion valve 38) of the cooling-heating switching unit 30 in FIGS. 1 and 2 which is in cooling operation is closed, the high-and-low-pressure gas branch pipe 35 is closed. Since in simultaneous cooling and heating operation, the high-temperature and high-pressure gas refrigerant is fed to the high-and-low-pressure gas main pipe 24, the refrigerant may radiate heat at the pipe surface of the high-and-low-pressure gas branch pipe 35, be condensed, and turn into liquid refrigerant (see the high-and-low-pressure gas branch pipe 35d in FIGS. 1 and 2).

For this reason, in the air conditioner according to the comparative example in FIG. 2, a bypass capillary 37 is provided in parallel with the high-and-low-pressure gas pipe expansion valve 38. The bypass capillary 37 allows the refrigerant to flow at a flow rate according to the differential pressure from the indoor-unit heat exchanger 41 side, which thus prevents the refrigerant in the high-and-low-pressure gas branch pipe 35 from being condensed and liquefying (see the bypass capillary 37d in FIG. 2).

However, in the air conditioner according to the comparative example in FIG. 2, a certain amount of high-temperature and high-pressure refrigerant flows through the bypass capillary 37, which is one of the factors in lowering use efficiency of the high-temperature and high-pressure gas refrigerant in the air conditioner (for example, the indoor unit 40a in FIG. 2).

If the bypass capillaries 37 are not provided, the amount of refrigerant accumulated in the high-and-low-pressure gas branch pipes 35 or the like varies depending on the piping construction or the operating condition, which necessitates a refrigerant-amount adjustment tank 17 on the outdoor unit side to adjust the amount of refrigerant (see FIG. 2). Note that although the refrigerant-amount adjustment tank 17 is installed on the liquid main pipe 21 in FIG. 2, there is also a refrigerant-amount adjustment tank available which is connected to a liquid pipe and a gas pipe with valves and pipes and includes a mechanism to switch between reserving and discharging liquid by the valves.

In the air conditioner according to this embodiment in FIG. 1, the opening degree of the high-and-low-pressure gas pipe expansion valve 31 (high-and-low-pressure gas pipe expansion valve 31d in FIG. 1) is adjusted to control the flow rate of refrigerant, and thus to control the amount of the liquid refrigerant condensed in the high-and-low-pressure gas branch pipe 35. This eliminates the necessity for the bypass capillaries 37 (bypass capillary 37d) and the refrigerant-amount adjustment tank 17 in FIG. 2.

The indoor-unit heat exchanger 41 of the indoor unit 40 in FIGS. 1 and 2 has a low-pressure non-operation state for not allowing the high-temperature and high-pressure gas refrigerant or the low-temperature liquid refrigerant (or gas-liquid two-phase refrigerant) to flow (see the indoor unit 40c and the cooling-heating switching unit 30c). In this low-pressure non-operation state, the high-and-low-pressure gas pipe expansion valve 31 (high-and-low-pressure gas pipe expansion valve 38) of the cooling-heating switching unit 30 is closed, and the indoor-unit expansion valve 42 of the indoor unit 40 is also closed.

For this reason, when the high-and-low-pressure gas main pipe 24 is fed with the high-temperature and high-pressure gas refrigerant, the refrigerant may radiate heat at the pipe surface of the high-and-low-pressure gas branch pipe 35, be condensed, and turn into liquid refrigerant (see the high-and-low-pressure gas branch pipe 35c in FIG. 2).

In the air conditioner according to the comparative example in FIG. 2, as in the case of the foregoing cooling operation, providing the bypass capillary 37 in parallel with the high-and-low-pressure gas pipe expansion valve 38 prevents the refrigerant in the high-and-low-pressure gas branch pipe 35 from being condensed and liquefying (see the bypass capillary 37c in FIG. 2).

In the air conditioner according to this embodiment in FIG. 1, the opening degree of the high-and-low-pressure gas pipe expansion valve 31 (high-and-low-pressure gas pipe expansion valve 31c in FIG. 1) is adjusted to control the flow rate of refrigerant, and thus to control the amount of the liquid refrigerant condensed in the high-and-low-pressure gas branch pipe 35. This eliminates the necessity for the bypass capillaries 37 (bypass capillary 37c) and the refrigerant-amount adjustment tank 17 in FIG. 2.

As described above, in the air conditioner according to this embodiment in FIG. 1, the high-and-low-pressure gas pipe expansion valve 31 of the cooling-heating switching unit 30 is configured to be capable of controlling the flow rate of the refrigerant by adjusting the opening degree, in addition to the control of opening and closing. Alternatively, the indoor-unit expansion valve 42 is configured to be capable of controlling the flow rate of the refrigerant in the high-and-low-pressure gas branch pipe 35 and the like by adjusting the opening degree, in addition to serving as a throttle valve for performing the control of opening and closing as well as the pressure reduction.

This eliminates the necessity for the bypass capillaries 37 and the refrigerant-amount adjustment tank 17, and also suppresses a decrease in the feed amount of the high-temperature and high-pressure gas refrigerant.

More specifically, focusing on the fact that the condensation of the refrigerant at a closed portion such as the high-and-low-pressure gas branch pipe 35 leads to lack of refrigerant at the condenser, the degree of subcooling of the condenser is determined for the control in the air conditioner according to this embodiment. Specifically, if the degree of subcooling of the condenser is lower than a predetermined value, it is determined that the refrigerant is deficient, and the flow rate of the refrigerant in the high-and-low-pressure gas branch pipe 35 or the like is increased to collect the condensed refrigerant. If the degree of subcooling is larger than a predetermined value, it is determined that the refrigerant is excessive, and the high-and-low-pressure gas branch pipe 35 or the like is closed to condense and accumulate the refrigerant .

The degree of subcooling of the condenser can be determined from the pressure and temperature of the refrigerant at the outlet of the condenser.

Figure 3:
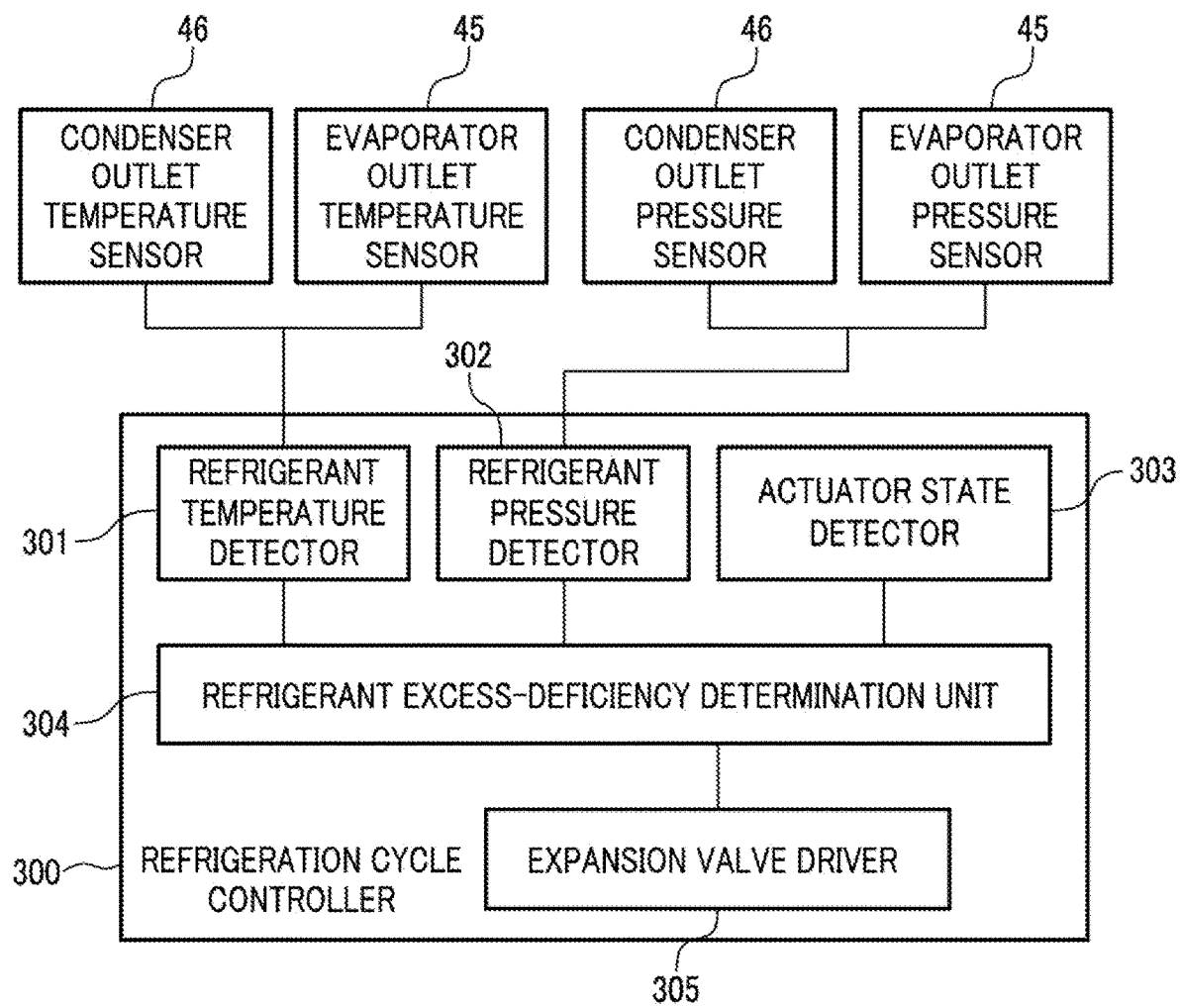
FIG. 3 is a diagram illustrating the configuration of a control circuit of the air conditioner.

Next, the configuration of the control circuit of the air conditioner according to this embodiment will be described using FIG. 3.

A refrigeration cycle controller 300 of the air conditioner according to this embodiment has a refrigerant temperature detector 301 for detecting refrigerant temperature and a refrigerant pressure detector 302 for detecting refrigerant pressure, to which are connected evaporator outlet sensors 45a, 45b, 45c, and 45d (hereinafter, generally referred to as evaporator outlet sensors 45) illustrated in the refrigeration cycle diagram in FIG. 1 and condenser outlet sensors 46a, 46b, 46c, and 46d (hereinafter, generally referred to as condenser outlet sensors 46) to detect refrigerant temperature and refrigerant pressure.

The evaporator outlet sensor 45 and the condenser outlet sensor 46 each include a pressure sensor for detecting refrigerant pressure and a temperature sensor for detecting refrigerant temperature.

In addition, provided on the refrigerant discharge side of the compressor 11 is a high-pressure side pressure sensor 47, and on the refrigerant suction side a low-pressure side pressure sensor 48.

Further, provided upstream and downstream of the outdoor-unit heat exchanger 14 on the refrigerant flow path are an evaporator outlet sensor 51 and a condenser outlet sensor 50. The evaporator outlet sensor 51 and the condenser outlet sensor 50 each include a pressure sensor for detecting refrigerant pressure and a temperature sensor for detecting refrigerant temperature.

Note that the evaporator outlet sensors 45 and the condenser outlet sensors 46 may only include a temperature sensor, by using the detection pressure at the low-pressure side pressure sensor 48 as the refrigerant pressure at the outlet of the evaporator and using the detection pressure at the high-pressure side pressure sensor 47 as the refrigerant pressure at the outlet of the condenser.

An actuator state detector 303 detects the valve opening degree of the indoor-unit expansion valve 42.

A refrigerant excess-deficiency determination unit 304 calculates the degree of subcooling of refrigerant based on the detection result of the refrigerant temperature detector 301, the refrigerant pressure detector 302, or the actuator state detector 303, and determines whether the refrigerant is excessive or deficient.

If the refrigerant is excessive based on the determination result of the refrigerant excess-deficiency determination unit 304, an expansion valve driver 305 operates to close the valve opening degree of the high-and-low-pressure gas pipe expansion valve 31 of the cooling-heating switching unit 30 in cooling operation or the low-pressure non-operation state. The high-and-low-pressure gas branch pipe 35 is closed with this operation, and the refrigerant is condensed in the high-and-low-pressure gas branch pipe 35. Thus, it is possible to adjust the amount of refrigerant in the refrigeration cycle.

In this case, if multiple indoor units 40 are in cooling operation or in the low-pressure non-operation state, the valve opening degrees of the high-and-low-pressure gas pipe expansion valves 31 of the indoor units 40 are closed sequentially.

As described with FIG. 1, even for the indoor unit 40 (see indoor unit 40b) in the heating high-pressure non-operation state, controlling the valve opening degrees of the high-and-low-pressure gas pipe expansion valve 31 and the indoor-unit expansion valve 42 makes it possible to accumulate more condensed refrigerant than closing the high-and-low-pressure gas pipe expansion valve 31. If the refrigerant cannot be accumulated in any other places, the indoor-unit expansion valve 42 is closed to accumulate condensed refrigerant.

If it is determined that the refrigerant is deficient based on the determination result of the refrigerant excess-deficiency determination unit 304, the expansion valve driver 305 opens sequentially the high-and-low-pressure gas pipe expansion valves 31 which are in cooling operation, the low-pressure non-operation state, or the heating high-pressure non-operation state, and the valves of which are closed. This operation allows the flow of the refrigerant accumulated in the closed high-and-low-pressure gas branch pipe 35 or the flow of the refrigerant accumulated in the indoor unit in the high-pressure non-operation state, collecting the condensed refrigerant, and thus solving the deficiency of the refrigerant.

Figure 4:
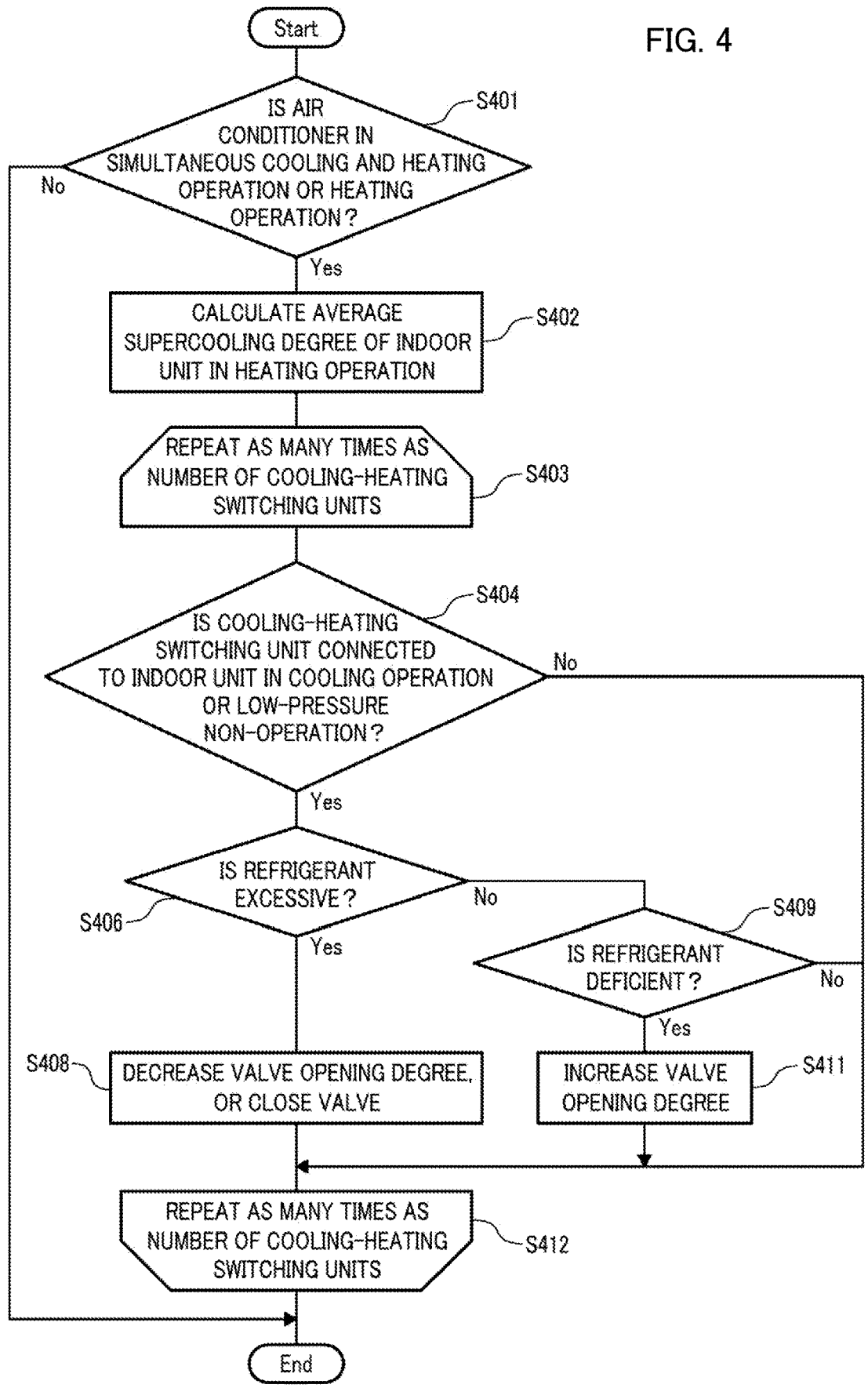
FIG. 4 is an expansion valve control flowchart of the embodiment.

Next, using FIG. 4, descriptions will be provided in detail for the control procedure for the high-and-low-pressure gas pipe expansion valve 31 for adjusting the condensation of the refrigerant in closed portions such as the high-and-low-pressure gas branch pipe 35, the procedure being controlled by the refrigeration cycle controller 300 of the air conditioner according to this embodiment.

The control procedure in FIG. 4 is performed at predetermined intervals to adjust the refrigerant condensation of the air conditioner according to this embodiment.

First, it is determined whether the target air conditioner (for example, the outdoor unit 10 in FIG. 1) is in simultaneous cooling and heating operation or in heating operation (S401) . If the air conditioner is not in simultaneous cooling and heating operation or heating operation, it is not necessary to run high-temperature and high-pressure gas refrigerant in the high-and-low-pressure gas pipe, and thus the refrigerant does not accumulate. Accordingly, the control procedure is terminated. (No at S401)

If the target air conditioner is in simultaneous cooling and heating operation or heating operation, the process proceeds to step S402 (Yes at S401).

At step S402, the average degree of subcooling of indoor units in heating operation is calculated. If the number of indoor units in heating operation is one, the average degree of subcooling is equal to the degree of subcooling of the indoor unit. If the number of indoor units in heating operation is plural, the degree of subcooling of those units may be averaged by the number, or the average may be obtained after correcting the degree of subcooling of an indoor unit having a large capacity.

Note that the degree of subcooling of an indoor unit is calculated by detecting the refrigerant outlet pressure and the refrigerant outlet temperature of the indoor-unit heat exchanger 41 with the condenser outlet sensor 46, determining the refrigerant saturation temperature of the outlet pressure, and calculating the difference between this saturation temperature and the detected outlet temperature.

Whether the refrigerant is excessive or deficient is determined based on whether the average degree of subcooling of the indoor-unit heat exchanger 41 of the target indoor unit 40, which has been calculated at step S402, is within the range of the degree of subcooling at the time when the amount of the refrigerant is appropriate. More specifically, if a calculated degree of subcooling is smaller than the appropriate range of the degree of subcooling, it is determined that the refrigerant is deficient. If a calculated degree of subcooling is larger than the appropriate range of the degree of subcooling, it is determined that the refrigerant is excessive.

The processing between step S403 and step S412 is executed sequentially as many times as the number of cooling-heating switching units 30 of the air conditioner according to the embodiment.

At step S404, it is determined whether the target cooling-heating switching unit 30 is connected to an indoor unit in cooling operation or in the low-pressure non-operation state.

If an indoor unit 40 in cooling operation or in the low-pressure non-operation state is not connected, the process proceeds to step S412 (No at S404), and processing for the next cooling-heating switching unit 30 is performed.

If an indoor unit 40 in cooling operation or in the low-pressure non-operation state is connected (the indoor units 40c and 40d in FIG. 1), the process proceeds to step S406 (Yes at S404).

If it is determined at step S406 using the calculated degree of subcooling that the refrigerant is excessive, the process proceeds to step S408 (Yes at S406). If not, the process proceeds to step S409 (No at S406).

If it is determined at step S409 using the calculated degree of subcooling that the refrigerant is deficient, the process proceeds to step S411 (Yes at S409). If not, the process proceeds to step S412 (No at S409), and processing for the next cooling-heating switching unit 30 is performed.

At step S408, the valve opening degree of the high-and-low-pressure gas pipe expansion valve 31 of the target cooling-heating switching unit 30 is decreased to reduce the flow rate of the refrigerant, or the high-and-low-pressure gas pipe expansion valve 31 is closed. This operation allows the condensed refrigerant to be accumulated in the high-and-low-pressure gas branch pipe 35 of the selected cooling-heating switching unit 30, thus making it possible to adjust the amount of refrigerant in the refrigeration cycle to an appropriate one.

At step S411, the valve opening degree of the high-and-low-pressure gas pipe expansion valve 31 of the target cooling-heating switching unit 30 is increased to allow the refrigerant to flow or to increase the flow rate of the refrigerant (S411). With this operation, liquid refrigerant accumulated in a high-and-low-pressure gas branch pipe 35 (one of the high-and-low-pressure gas branch pipes 35b, 35c, and 35d) of a selected cooling-heating switching unit 30 is collected, and the amount of the refrigerant is adjusted to be appropriate.

In the above processing, the condensation of the refrigerant is adjusted such that the degree of subcooling of the refrigerant is within an appropriate range. Hence, if the appropriate range of the degree of subcooling for determining whether the refrigerant is excessive or deficient is determined in view of the energy efficiency of the air conditioner, it is possible to provide a simultaneous cooling-heating multi-air conditioner with high energy efficiency.

Since in the air conditioner according to this embodiment, the condensed refrigerant is accumulated in the high-and-low-pressure gas branch pipe 35 when the refrigerant is excessive, the refrigerant-amount adjustment tank 17 is not necessary, or the capacity of the refrigerant-amount adjustment tank 17 may be small. For this reason, this has the effect of cost reduction.

For the above air conditioner according to this embodiment, descriptions have been provided for an example in which the high-and-low-pressure gas pipe expansion valves 31 of the cooling-heating switching units 30 are variable expansion valves capable of controlling the flow rate of the refrigerant by adjusting the opening degree, in addition to opening and closing. Using FIG. 5, a modification of the high-and-low-pressure gas pipe expansion valve 31 will be described.

As described above, the opening degree of the high-and-low-pressure gas pipe expansion valve 31 is adjusted to control the flow rate of the refrigerant to collect the liquid refrigerant in the high-and-low-pressure gas branch pipe 35 or to prevent the gas refrigerant from being condensed. However, in this case, the control range of the valve opening degree to be controlled is not large.

Figure 5:
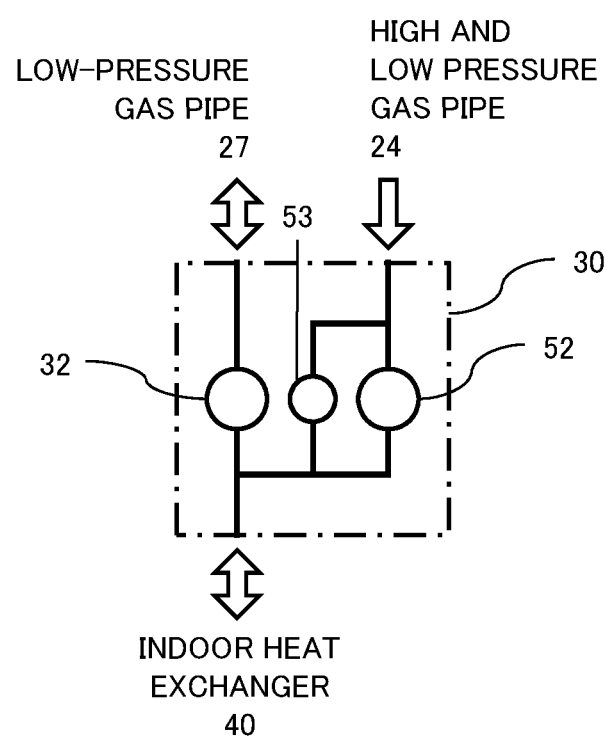
FIG. 5 is a diagram illustrating a modification of the configuration of a cooling-heating switching unit according to the embodiment.

In view of the above, the high-and-low-pressure gas pipe expansion valve in a cooling-heating switching unit 30 of FIG. 5 includes two expansion valves provided in parallel, a high-and-low-pressure gas pipe main expansion valve 52 for opening or closing the flow of refrigerant and a high-and-low-pressure gas pipe sub expansion valve 53, the absolute vale of the flow rate of which is not large, but which is capable of changing the flow rate.

In the case where the liquid refrigerant in the high-and-low-pressure gas branch pipe 35 is collected or the case of running the gas refrigerant to prevent the gas refrigerant from being condensed, the high-and-low-pressure gas pipe main expansion valve 52 is closed, and the valve opening degree of the high-and-low-pressure gas pipe sub expansion valve 53 is adjusted to run the refrigerant. The high-and-low-pressure gas pipe sub expansion valve 53 has a small diameter, and thus is excellent in controllability at a minute flow rate. If the high-and-low-pressure gas pipe main expansion valve 52 is opened or closed, the refrigerant may be collected excessively, or the increase in the gas bypass amount may decrease the heating capacities of other indoor units in heating operation. This configuration is effective to prevent such problems. Further, not only being capable of opening and closing operations, this configuration is suitable for increasing or decreasing the valve opening degree of the expansion valve to positively adjust the amount of refrigerant.

REFERENCE SIGNS LIST

10: outdoor unit
11: compressor
12: high-and-low-pressure gas pipe side four-way valve
13: heat-exchanger side four-way valve
14: outdoor-unit heat exchanger
15: outdoor-unit expansion valve
21: liquid main pipe
24: high-and-low-pressure gas main pipe
27: low-pressure gas main pipe
30, 30a, 30b, 30c, 30d: cooling-heating switching unit
31, 31a, 31b, 31c, 31d: high-and-low-pressure gas pipe expansion valve
32, 32a, 32b, 32c, 32d: low-pressure gas pipe expansion valve
35, 35a, 35b, 35c, 35d: high-and-low-pressure gas branch pipe
40, 40a, 40b, 40c, 40d: indoor unit
41, 41a, 41b, 41c, 41d: indoor-unit heat exchanger
42, 42a, 42b, 42c, 42d: indoor-unit expansion valve
52: high-and-low-pressure gas pipe main expansion valve
53: high-and-low-pressure gas pipe sub expansion valve
300: refrigeration cycle controller
301: refrigerant temperature detector
302: refrigerant pressure detector 304: refrigerant excess-deficiency determination unit
305: expansion valve driver

The invention claimed is:

1. An air conditioner having a plurality of indoor units and being capable of operating cooling operation and heating operation simultaneously by switching cooling-heating switching units connected to a corresponding one of the indoor units respectively, the air conditioner comprises:
   high-and-low-pressure gas pipe expansion valves each of which is provided to a corresponding one of the cooling-heating switching units and adjusts feeding of high-temperature and high-pressure gas refrigerant to the corresponding indoor unit; and
   a refrigeration cycle controller which adjusts a valve opening degree of the high-and-low-pressure gas pipe expansion valve of the cooling-heating switching unit connected to one of the indoor units which is not in heating operation, in accordance with a determination result on excess or deficiency of refrigerant in a refrigeration cycle.

2. The air conditioner according to claim 1, wherein
   the refrigeration cycle controller adjusts the valve opening degree of the high-and-low-pressure gas pipe expansion valve of one of the indoor units which is not in heating operation, but in cooling operation or in a low-pressure non-operation state.

3. The air conditioner according to claim 1, wherein
   if the refrigeration cycle controller determines that the refrigerant is excessive in the refrigeration cycle, the refrigeration cycle controller closes the high-and-low-pressure gas pipe expansion valve or decreases the valve opening degree of the high-and-low-pressure gas pipe expansion valve, and
   if the refrigeration cycle controller determines that the refrigerant is deficient in the refrigeration cycle, the refrigeration cycle controller increases the valve opening degree of the high-and-low-pressure gas pipe expansion valve.

4. The air conditioner according to claim 1, wherein
   when a degree of subcooling of the refrigerant at an outlet of a heat exchanger in one of the indoor units which is in heating operation is smaller than values in a predetermined range, the refrigeration cycle controller determines that the refrigerant is deficient, and
   when the degree of subcooling is larger than the values in the predetermined range, the refrigeration cycle controller determines that the refrigerant is excessive.

5. The air conditioner according to claim 1, wherein
   the refrigeration cycle controller adjusts the valve opening degree of the high-and-low-pressure gas pipe expansion valve to adjust the amount of the refrigerant condensed and accumulated in a high-and-low-pressure gas branch pipe on an inlet side of the high-and-low-pressure gas pipe expansion valve.

6. The air conditioner according to claim 1, wherein
   the high-and-low-pressure gas pipe expansion valve includes an opening closing valve to open or close a flow of the refrigerant and a variable valve a valve opening degree of which varies within a range in which a flow rate of the variable valve is smaller than the opening closing valve, the opening closing valve and the variable valve being provided in parallel, and
   the refrigeration cycle controller adjusts the valve opening degree of the variable valve in accordance with excess or deficiency of the refrigerant in the refrigeration cycle.

7. The air conditioner according to claim 1, wherein
   a heat exchanger in each of the indoor units includes an indoor-unit expansion valve which is used to perform pressure reduction throttling of the refrigerant, and the valve opening degree of which is adjusted to adjust a flow rate of the refrigerant, and
   when the refrigeration cycle controller determines that the refrigerant is excessive in the refrigeration cycle, the refrigeration cycle controller opens the high-and-low-pressure gas pipe expansion valve of the cooling-heating switching unit connected to one of the indoor units which is in a heating high-pressure non-operation state, and adjusts the valve opening degree of the indoor-unit expansion valve of the indoor unit in the heating high-pressure non-operation state to accumulate condensed refrigerant in the heat exchanger in the indoor unit in the heating high-pressure non-operation state.

8. An air conditioner, comprising:
   a plurality of indoor units;
   a plurality of cooling-heating switching units each including a high-and-low-pressure gas pipe expansion valve which is used to open or close a flow of high-temperature and high-pressure refrigerant, and a valve opening degree of which is adjusted to adjust a flow rate of the high-temperature and high-pressure refrigerant, and a low-pressure gas pipe expansion valve used to open or close a flow of low-pressure refrigerant, each of the cooling-heating switching units being connected to a corresponding one of the indoor units and configured to switch cooling operation and heating operation of the indoor unit; and
   a refrigeration cycle controller which adjusts the valve opening degree of the high-and-low-pressure gas pipe expansion valve of the cooling-heating switching unit connected to one of the indoor units which is not in heating operation, in accordance with a determination result on excess or deficiency of refrigerant in a refrigeration cycle.

9. The air conditioner according to claim 8, wherein
   an indoor-unit heat exchanger in each of the indoor units has an indoor-unit expansion valve which is used to perform pressure reduction throttling of the refrigerant and the valve opening degree of which is adjusted to adjust a flow rate of the refrigerant, and
   the refrigeration cycle controller adjusts the valve opening degrees of the indoor-unit expansion valve of an indoor unit and the high-and-low-pressure gas pipe expansion valve of a cooling-heating switching unit in a heating high-pressure non-operation state.

10. An air conditioner having a plurality of indoor units and being capable of operating cooling operation and heating operation simultaneously by switching cooling-heating switching units connected to a corresponding one of the indoor units respectively, the air conditioner comprises:
   high-and-low-pressure gas pipe expansion valves each of which is provided to a corresponding one of the cooling-heating switching units and adjusts feeding of high-temperature and high-pressure gas refrigerant to the corresponding indoor unit; and a refrigeration cycle controller which adjusts a valve opening degree of the high-and-low-pressure gas pipe expansion valve of the cooling-heating switching unit connected to one of the indoor units which is not in heating operation, such that a degree of subcooling of refrigerant at an outlet of an indoor-unit heat exchanger of one of the indoor units which is in heating operation is within a predetermined range.

\* \* \* \* \*